United States Patent [19]
Bacskai et al.

[11] 3,894,115
[45] July 8, 1975

[54] UNSATURATED POLYESTERS HAVING HIGH IMPACT STRENGTH AND LOW WATER ABSORPTION

[75] Inventors: Robert Bacskai, Kensington; John B. Wilkes, Richmond, both of Calif.

[73] Assignee: Chevron Research Company, San Francisco, Calif.

[22] Filed: May 20, 1974

[21] Appl. No.: 471,623

Related U.S. Application Data

[63] Continuation-in-part of Ser. No. 323,572, Jan. 15, 1973, abandoned.

[52] U.S. Cl. .............................. 260/861; 260/75 UA
[51] Int. Cl. .............................................. C08f 21/00
[58] Field of Search ...................... 260/861, 75 UA

[56] References Cited
UNITED STATES PATENTS

| | | | |
|---|---|---|---|
| 2,632,753 | 3/1953 | Anderson | 260/45.4 |
| 3,042,650 | 7/1962 | Bockstahler | 260/861 |
| 3,345,339 | 10/1967 | Parker et al. | 260/75 |

OTHER PUBLICATIONS

Boenig, "Unsaturated Polyesters," pp. 67–70, Elsevier, 1964 TP986 P6 B57.

*Primary Examiner*—Morris Liebman
*Assistant Examiner*—E. A. Nielsen
*Attorney, Agent, or Firm*—G. F. Magdeburger; John Stoner, Jr.; T. G. DeJonghe

[57] ABSTRACT

Unsaturated polyesters formed from the condensation reaction of unsaturated and saturated dibasic acids and dihydric alcohols, at least a portion of which is 3-methyl-1,5-pentanediol, exhibit unexpectedly advantageous physical properties when copolymerized with an ethylenically unsaturated monomer.

14 Claims, No Drawings

UNSATURATED POLYESTERS HAVING HIGH IMPACT STRENGTH AND LOW WATER ABSORPTION

CROSS-REFERENCE TO RELATED APPLICATION

This application is a continuation-in-part of application Ser. No. 323,572 filed Jan. 15, 1973, now abandoned.

BACKGROUND OF THE INVENTION

1. Field of the Invention

This invention relates to unsaturated polyester resins which comprise a mixture of an ethylenically unsaturated copolymerizable monomer and a condensation polymer formed by polyesterifying unsaturated and saturated dicarboxylic acids with dihydric alcohols. More particularly, the invention relates to unsaturated polyesters made from 3-methyl-1,5-pentanediol. These unsaturated polyester resins are useful in the manufacture of many materials, for example, building panels, boat hulls, car bodies, etc.

2. Description of the Prior Art

It is known that unsaturated polyesters can be prepared by the reaction of unsaturated and saturated dicarboxylic acids and dihydric alcohols and that these polyesters can be cross-linked with reactive ethylenically unsaturated monomers to form thermoset resins which have found acceptance as laminating agents, surface coatings, building panels, boat hulls, etc. However, the majority of such prior commercially available polyester compositions have either relatively poor hydrolytic stability or low impact strength and, accordingly, have not proven entirely satisfactory in applications where high hydrolytic stability or impact strength is essential, for example, in boat hulls. Accordingly, unsaturated polyesters with high impact strength and low water absorption are much desired in the art.

In addition to water absorption and impact strength, other properties of the unsaturated polyesters are also very important, for example, tensile and flexural strength, modulus of elasticity, processability, and thermal degradation. When considering the suitability of any polyester for a particular use, all of its physical properties must be taken into consideration.

It is knwon in the art that the physical properties of unsaturated polyesters can be varied in many ways, for example, changing the chain length or skeletal structure, changing the unsaturated diacid, changing the ratio of the unsaturated to saturated diacid, etc. However, changing one of the components in the polyester often leads to improvements in some of its physical properties with corresponding decreases in other physical properties. For example, it has generally been found that polyesters with high impact strength have high water absorption, and polyesters with high resistance to water absorption have correspondingly low impact strengths.

Studies have been made in the prior art of the effect of the glycol structure on water absorption and impact strength of cured polyesters. Presented below are the results of such a study, appearing in "Unsaturated Polyesters", by H. V. Boenig, page 98, Elsevier (1964).

TABLE I

Effect of Glycol Structure on Water Absorption of Cured Polyesters

| No. | Glycol Name | Structure | Water Absorption, % |
|---|---|---|---|
| 1. | 1,2-Ethanediol | HO—CH$_2$CH$_2$—OH | 0.15 |
| 2. | 1,2-Propanediol | HO—CH$_2$CH(CH$_3$)—OH | 0.25 |
| 3. | 2,3-Butanediol | HO—CH(CH$_3$)—CH(CH$_3$)—OH | 0.35 |
| 4. | 1,5-Pentanediol | HO—CH$_2$CH$_2$CH$_2$CH$_2$CH$_2$—OH | 0.8 |

Comparison of Examples 1, 2 and 3 shows that the addition of a branched methyl group leads to increased water absorption. Example 4, when compared to Example 1, shows increased water absorption with increasing chain length.

3-methyl-1,5-pentanediol is a known compound which has been used in making plasticizer useful in polyvinyl chloride compositions, see U.S. Pat. Nos. 2,909,499 and 2,700,656. Also, 3-methyl-1,5-pentanediol has appeared in lists of diols which could possibly be used in making polyester resins, see U.S. Pat. Nos. 3,042,650; 3,287,320; and 3,256,363. However, the unexpectedly improved physical properties of unsaturated polyesters made from 3-methyl-1,5-pentanediol have heretofore been unknown.

SUMMARY OF THE INVENTION

An unsaturated polyester composition comprising approximately equimolar amounts of:

a. a dihydric alcohol or mixture of dihydric alcohols comprising at least 10 mol percent 3-methyl-1,5-pentanediol;

b. a dicarboxylic acid or anhydride comprising at least 20 mol percent ethylenically unsaturated dicarboxylic acid or anhydride.

The mol percent of the 3-methyl-1,5-pentanediol is based on the total mols of dihydric alcohols or alcohol. The mol percent of the ethylenically unsaturated dicarboxylic acid or anhydride, is based on the total mols of dicarboxylic acid or anhydride.

When copolymerized with an ethylenically unsaturated monomer, said polyesters exhibit superior physical properties.

In view of the aforementioned prior art, one would predict that thermoset unsaturated polyesters made from 3-methyl-1,5-pentanediol would have a greater water absorption than those made from either 1,2-propanediol or 1,5-pentanediol. Surprisingly, it has been found that cured polyesters made from 3-methyl-1,5-pentanediol have lower water absorption than would be predicted from the prior art, and that these polyesters also have high impact and flexural strength, and high retention of flexural strength upon exposure to water.

Another disadvantage with most polyester compositions is that relatively long reaction times are required in their preparation. For example, it is not uncommon in the preparation of unsaturated polyesters from propylene glycol to have reaction times ranging from 16 to 40 hours. However, processing times with 3-methyl-1,5-pentanediol generally are significantly shorter.

The polyesters produced in accordance with the present invention are preferably random polyesters, as opposed to block polyesters. The previously cited Boenig reference discusses random and block polyesters, e.g., at pages 76 and 77.

DETAILED DESCRIPTION OF THE INVENTION

Unsaturated polyesters and methods of making them are well known in the art. See, for example, U.S. Pat. Nos. 3,042,650; 3,631,224; or 3,320,336. The unsaturated polyester portion is a condensation polymer formed by polyesterifying dicarboxylic acids or anhydrides with dihydric alcohols. The term "unsaturated polyester", as used herein, is defined as the condensation polymer produced by condensing dicarboxylic acids or its anhydride with the dihydric alcohol in approximately equimolar proportions, and wherein at least a portion of which the dicarboxylic compound contains ethylenic unsaturation. The term "unsaturated polyester resin," as used herein, is meant to define the combination of:

a. the condensation polymer or unsaturated polyester defined above; and b. an ethylenically unsaturated copolymerizable monomer, such as styrene, which can be copolymerized with the unsaturated polyester.

The term "thermoset polyester resin," as used herein, means the cured, cross-linked or copolymerized unsaturated polyester resin described above.

To provide for cross-linking of the polyester with the ethylenically unsaturated monomer, the dicarboxylic acid component of the polyester must contain some unsaturated dicarboxylic acids. The ratios of the saturated to unsaturated dicarboxylic acids employed can be varied over wide ranges depending upon the physical properties desired in the cured polyester. Ratios of from 80:20 to 20:80 saturated/unsaturated dicarboxylic acids can be used, but preferably from about 40-60 mol percent of the total dicarboxylic acids or anhydrides contain ethylenic unsaturation. Examples of suitable unsaturated dicarboxylic acids include maleic, fumaric, methyl maleic, itaconic, etc. Maleic acid and its anhydride are preferred.

The remainder of the dicarboxylic acids are either a dicarboxylic acid or its anhydride having no polymerizable double bonds: for example, aromatic acids such as orthophthalic acid, isophthalic acid, terephthalic acid; or saturated acids and anhydrides such as adipic acid, glutaric acid, sebasic acid, etc., and their anhydrides.

The dicarboxylic acids, which preferably contain from 4 to 10 carbon atoms, are polyesterified with approximately equimolar amounts of the dihydric alcohols. The condensation product is normally approximately equimolar; however, a 5–10% excess of the dihydric alcohol is often used in the reaction to make up for volatilization losses of the alcohol during the reaction.

To obtain the desired improvements in resistance to water absorption and impact strength, at least about 10 mol percent of the dihydric alcohols should be 3-methyl-1,5-pentanediol. Preferably, at least 25 mol percent, and more preferably at least 40 mol percent, of the 3-methyl-1,5-pentanediol is used. The remainder of the dihydric alcohols can be any of the commonly used alkanediols or oxyalkanediols, such as ethylene glycol, propylene glycol, diethylene glycol, 1,2-propanediol, 1,5-pentanediol, 1,6-hexanediol, etc. Preferred diols contain from 2 to 10 carbon atoms. The use of these different diols and dicarboxylic acids permit the tailoring of the physical properties of the polyesters to specific applications.

Best results, e.g., impact strength and flexural strength for the cured resin, have generally been found when using the 3-methyl-1,5-pentanediol in substantial pure form as the dihydric alcohol constituent.

3-methyl-1,5-pentanediol, as discussed above, is a known diol, and can be readily obtained by known methods. For example, see "Organic Synthesis," 34, 71 (1954).

The resulting unsaturated polyesters can be blended with one or more ethylenically unsaturated polymerizable monomers containing a $>C=CH_2$ group, such as, for example, styrene and its derivatives. The monomer acts as both a solvent for the polyester and as a subsequent copolymerization agent. Examples of such monomers include styrene, alpha-methyl styrene, vinyl toluene, methyl methacrylate, ethyl acrylate, etc. The proportion of the cross-linking monomer relative to the polyester can vary over wide ranges, depending upon the desired reactivity and rigidity of desired product. Normally the weight of the polyester will range from about 25 to 75 percent, and preferably from about 50 to 70.

The blend of the unsaturated polyester and the monomer are copolymerized or cured by the conventional methods known in the art, for example, by the action of light, heat, or high-energy radiation, and more particularly by the use of a polymerization catalyst such as methyl ethyl ketone hydroperoxide.

Although the processing techniques are well known in the art, the processing time is another factor which is important in commerical operations. Processing times with unsaturated polyesters made from propylene glycol often range from 16 to 40 hours. Processing times, of course, depend upon the particular diols used, but with mixture of 3-methyl-1,5-pentanediol processing times were normally from 20 to 50% shorter while producing a polyester having equal or superior physical properties when compared to the unsaturated polyester made from propylene glycol.

Another problem with prior art unsaturated polyesters made from ethylene glycol is that they are not completely soluble in styrene, which is the preferred cross-linking agent. For this reason, the art in general has used propylene glycol, which gives a thermoset polyester resin which has rather low water absorption but extremely poor strength properties. Surprisingly, thermoset polyesters made from 3-methyl-1,5-pentanediol combine low water absorption with high strength and, in addition, the use of 3-methyl-1,5-pentanediol allows the use of considerable quantities of ethylene glycol in the preparation of polyesters which are soluble in the styrene, the preferred cross-linking agent.

EXAMPLES

The following examples illustrate methods of preparing the novel polyesters of this invention and compare the physical properties of these novel polyesters with known prior art unsaturated polyesters. These examples are offered to illustrate the invention and are not meant to limit it in any way.

EXAMPLES 1-10
Preparation of High-Acid-Number Polyesters

EXAMPLE 1

A 250-ml, 3-necked round-bottomed flask equipped with a stirrer, thermometer, gas inlet tube, and condensor with a Dean and Stark trap was charged with 62.2 grams (0.53 mol) of 3-methyl-1,5-pentanediol, 24.5 grams (0.25 mol) of maleic anhydride, 37 grams (0.25 mol) of phthalic anhydride, and 0.018 gram of hydroquinone. The contents of this flask were stirred at 170°–205°C. for three hours under a stream of nitrogen gas. During this time, 8 ml of water was removed and collected in the trap. The resin had an acid number of 45.4. The acid number is determined using the ordinary method, i.e., by measuring the milligrams of potassium hydroxide that will neutralize one gram of the resin. The flask was cooled to 140°C., and 64.3 grams of styrene stabilized with 0.03% hydroquinone was added with stirring. The resulting solution was cooled to room temperature to give 176.1 grams of an unsaturated polyester/styrene solution (36.5 weight percent styrene).

Other unsaturated polyesters were prepared in the same way from other glycols using the same molar ratios of reactants as before as follows:

| Ex. No. | Glycol | Mols | Acid No. | Styrene Sol'n*, grams |
|---|---|---|---|---|
| 2 | Ethylene Glycol | 1.05 | 42.4 | 263** |
| 3 | 1,2-Propanediol | 1.05 | 60.7 | 280.6 |
| 4 | 1,5-Pentanediol | 1.05 | 45.8 | 337.0 |
| 5 | 1,6-Hexanediol | 1.05 | 27.9 | 356.2 |
| 6 | Diethylene Glycol | 1.05 | 51.6 | 334.5 |
| 7 | 3-Methyl-1,5-Pentanediol 1,2-Propanediol | 0.525 / 0.525 | 40.8 | 318.4 |
| 8 | 3-Methyl-1,5-Pentanediol Ethylene Glycol | 0.262 / 0.782 | 44.2 | 280.9 |
| 9 | 3-Methyl-1,5-Pentanediol Ethylene Glycol | 0.21 / 0.84 | 51.0 | 287.6 |
| 10 | 3-Methyl-1,5-Pentanediol Ethylene Glycol | 0.175 / 0.875 | 52.1 | 284.6 |

*All contained 36.5% styrene.
**The mixture is turbid and separates into two phases upon standing.

Curing of Unsaturated Polyester/Styrene Solutions

The polyester/styrene solutions of Example Nos. 1, 2, 3, 5, 6 and 8, were cured in the following way. The unsaturated polyester/styrene mixture, 150 grams, was combined by stirring with 1.5 ml of a 1% solution of cobalt 2-ethylhexanoate in styrene and 3 ml of a 50% solution of methyl ethyl ketone hydroperoxide. The resulting solution was poured into a cell formed from two glass plates, faced with Mylar film, and separated by a ¼-inch (6.4 mm) spacer. The internal dimensions of the cell were: 146 × 146 × 6.4 mm. The resin was cured by standing at room temperature (22°C.) for twenty hours. At the end of this time, the cell was opened; the cured, solid polyester plate was removed and cut into strips 12.8 mm in width. Inspections of the cured polyester were determined on these test specimens (Table II).

The products of Examples 4, 7, 9 and 10 were each cured in the following way. The ester/styrene solution, 280 grams, was mixed with 2.8 ml of a 1% cobalt-2-ethylhexanoate in styrene solution and 5.6 ml of a 50% solution of methyl ethyl ketone hydroperoxide. The resulting solution was poured into a cell, as noted above, but having internal dimensions of 271 mm × 144 mm × 6.4 mm. The resin was cured by standing twenty hours at room temperature. At the end of this time, the cell was opened, the solid, cured polyester plate was removed and cut into strips 12.8 mm in width and 144 mm long. Inspections of the cured polymer were determined on these test specimens (Tables II and III).

EXAMPLES 11-14
Preparation of Low-Acid-Number Unsaturated Polyester

These unsaturated polyesters were prepared in the same way, using the same molar ratios of reactants, as before (Example 1), except that the polymerization was continued for a longer period of time in order to obtain a product of low acid number, and the product was dissolved in sufficient styrene to give 40 weight percent styrene. The results were as follows:

| Ex. No. | Glycol | Mols | Time, hrs. | Acid No. | Quantity, gms. |
|---|---|---|---|---|---|
| 11 | 3-Methyl-1,5-pentanediol | 0.525 | 5-¼ | 33.8 | 206.2 |
| 12 | 1,2-Propanediol | 0.525 | 9-½ | 30.9 | 147.7 |
| 13 | Diethylene Glycol | 2.1 | 23 | 21.9 | 400 |
| 14 | 3-Methyl-1,5-pentanediol Ethylene Glycol | 0.524 / 1.564 | 23-¼ | 20.6 | 317 |

EXAMPLE 15-16
Preparation of Low-Acid-Number Isophthalic-Acid-Containing Polyesters

EXAMPLE 15

In the same type of apparatus as before, there were charged 80 grams (1.05 mols) of 1,2-propanediol, 83 grams (0.5 mol) of isophthalic acid and 0.036 gram of hydroquinone. This slurry was stirred and heated at 200°C. for 10.1 hours with nitrogen flowing through at a rate of 7.2 ml/min. During this time 16 ml of water was removed from the trap. Then, 49 grams (0.5 mol) of maleic anhydride was added, the temperature was raised to 215°C., and the nitrogen sparging rate was increased to 71.5 ml/min. The reaction was continued under these conditions for 11½ hours, during which time 5 ml of water was removed. The resin weighed 115 grams and had a final acid number of 26.

The resin was cooled to 176°C. and slowly added with rapid stirring to 78 grams of styrene containing 0.008 grams of diphenyl quinone and at a temperature of 70°C. The resulting solution was then cooled to room temperature.

EXAMPLE 16

The same procedure was repeated, except that the 1,2-propanediol was replaced by a mixture of 48 grams (0.782 mol) of ethylene glycol and 30.8 grams (0.262 mol) of 3-methyl-1,5-pentanediol. The first stage required 9 hours and the second 4¼ hours. The final product, 141.9 grams, had an acid number of 26.4. It was dissolved in 95 grams of styrene.

Curing Low-Acid-Number Polyester/Styrene Mixtures

The products of Examples 11-16 were each cured in the following way. To the polyester/styrene mixture, 150 grams, there was added 1.5 grams of a paste containing 50% dibenzoyl peroxide, 0.9 ml of a 50% solution of methyl ethyl ketone hydroperoxide, and, after these two were well dissolved, 0.75 ml of a 1% solution of cobalt-2-ethylhexanoate in styrene. The resulting solution was poured into the cell described in Example 2 and held at room temperature until gelling occurred. Then the resin was heated at 38°C. for 1 hour, raised to 135°C. over a period of 1 hour, and then heated for 1 hour at 135°C. At the end of this time it was cooled, sliced into strips as before, and tested. The results are given in Table IV.

TABLE II

PROPERTIES OF HIGH-ACID-NUMBER UNSATURATED POLYESTER CASTINGS

| PRODUCT OF EXAMPLE NO. | GLYCOL | IZOD IMPACT STRENGTH, (Ft.Lb./In.)* | BARCOL HARDNESS** | HEAT DISTORT. AT 264 PSI (°C.)# |
|---|---|---|---|---|
| 1 | 3-Methyl-1,5-Pentanediol | 4.9 | 77.0 | 48 |
| 2 | Ethylene Glycol ## | 1.9 | — | — |
| 3 | 1,2-Propanediol | 0.6 | 89.3 | 59 |
| 4 | 1,5-Pentanediol | 6.5 | 64.5 | 33 |
| 5 | 1,6-Hexanediol | 6.9 | 66.0 | 36 |
| 6 | Diethylene Glycol | 5.2 | 77.6 | 49 |
| 7 | 3-Methyl-1,5-Pentanediol / 1,2-Propanediol (1:1) | 1.5 | 85.0 | 51 |
| 8 | 3-Methyl-1,5-Pentanediol / Ethylene Glycol (1:3) | 2.6 | 90.3 | 56 |
| 9 | 3-Methyl-1,5-Pentanediol / Ethylene Glycol (1:4) | 0.9 | 86.1 | — |
| 10 | 3-Methyl-1,5-Pentanediol / Ethylene Glycol (1:5) | 1.0 | 87.3 | — |

*ASTM D-256-56
**Barcol Hardness Tester No. 935
ASTM D-648-56
Casting Opaque Due to Immiscibility

TABLE III

WATER ABSORPTION OF HIGH-ACID-NUMBER UNSATURATED POLYESTER CASTINGS

| PRODUCT OF EXAMPLE NO. | GLYCOL | WATER ABSORPTION, %, AFTER* | | | | |
|---|---|---|---|---|---|---|
| | | 66 Hr. | 120 Hr. | 240 Hr. | 336 Hr. | 405 Hr. |
| 1 | 3-Methyl-1,5-Pentanediol | 0.22 | 0.29 | 0.37 | 0.42 | 0.45 |
| 2 | Ethylene Glycol | — | 0.40 | >0.51 | >0.56 | 0.69 |
| 3 | 1,2-Propanediol | 0.28 | 0.40 | 0.54 | 0.63 | 0.69 |
| 4 | 1,5-Pentanediol | 0.37 | <0.51 | 0.63 | — | 0.78 |
| 5 | 1,6-Hexanediol | 0.27 | 0.33 | 0.44 | 0.50 | 0.54 |
| 6 | Diethylene Glycol | 0.58 | 0.74 | 1.02 | 1.20 | 1.29 |
| 7 | 3-Methyl-1,5-Pentanediol / 1,2-Propanediol (1:1) | 0.27 | <0.38 | 0.56 | — | 0.58 |
| 8 | 3-Methyl-1,5-Pentanediol / Ethylene Glycol (1:3) | — | 0.35 | >0.43 | >0.51 | 0.61 |

*Samples dried for 24 hours at 50°C. before weighing and immersing in distilled water. At the end of each indicated time period, a sample was removed, the surface was dried with a towel, and the sample weighed. The increase in weight was due to absorbed water.

TABLE IV

PROPERTIES OF LOW-ACID-NUMBER UNSATURATED POLYESTER CASTINGS

| PROD OF EX NO | GLYCOL | FLEXURAL PROPERTIES* | | | IZOD IMPACT STRENGTH,** Ft.Lb./In. | BARCOL HARDNESS # | HEAT DISTORT. TEMP. 264 psi ## °C. | WATER ABSORPTION,% | |
|---|---|---|---|---|---|---|---|---|---|
| | | STRENGTH psi × 10⁻³ | MODULUS psi × 10⁻³ | MAXIMUM STRAIN In./In. | | | | 23 Hr. | 1056 Hr. |
| PA Resins | | | | | | | | | |
| 11 | 3-Methyl-1,5-Pentanediol | 7.4∇ | 208∇ | 0.59∇ | 1.6 | 75 | 45 | 0.12 | 0.63 |
| 12 | 1,2-Propanediol | 6.5 | 427 | 0.15 | 0.6 | 84 | 84 | 0.15 | 1.01 |
| 13 | Diethylene Glycol | 12.2∇ | 367∇ | 0.54∇ | 2.0 | 77 | 55 | 0.20 | 1.20 |
| 14 | 3-Methyl-1,5-Pentanediol / Ethylene Glycol (1:3) | 11.8 | 430 | 0.33 | 0.9 | 83 | 85 | 0.13 | 0.79 |
| IPA Resins | | | | | | | | | |
| 15 | 1,2-Propanediol | 7.0 | 530 | .13 | 0.9 | 84 | 108 | 0.15 | 0.76 |
| 16 | 3-Methyl-1,5-Pentanediol / Ethylene Glycol (1:3) | 9.0 | 483 | | 1.5 | 82 | 89 | 0.13 | 0.71 |

*ASTM D-790-66
**ASTM D-256-56
Hardness Tester No. 935
ASTM D-648-56
∇Yield Point Values Comparison of the physical properties of the unsaturated polyesters in Table II demonstrates that, in Barcol hardness and in heat distortion temperature, the product from 3-methyl-1,5-pentanediol is better than that from either 1,5-pentanediol or 1,6-hexanediol. In Izod impact strength, the 3-methyl-1,5-pentane-diol product is weaker than these two, but is considerably superior to that from 1,2-propanediol.

In Table III are given the water absorption values for some of the products. A comparison of the properties as given in Table II and III shows that the unsaturated polyester made from 3-methyl-1,5-pentanediol has unexpectedly low water absorption values compared with that made from either 1,5-pentanediol or 1,6-hexanediol, and at the same time has strength properties greatly superior to that containing 1,2-propanediol products, and in some cases (Barcol hardness and heat distortion temperature) superior to the polyesters containing 1,5-pentanediol or 1,6-hexanediol.

It was shown in the prior art ("Unsaturated Polyesters," by H. V. Boenig) that water absorption increases with increasing chain length and with increased branching. Surprisingly, this does not hold true for 3-methyl-1,5-pentanediol.

Ethylene glycol is not a satisfactory gylcol for unsaturated polyesters, because such polyesters are not completely soluble in styrene, the preferred cross-linking agent (see Example 10). In general, the art has gone to 1,2-propanediol or diethylene glycol for the great bulk of the commercial polyesters. But polyesters made from diethylene glycol have a high water absorbance although good strength properties, whereas those from 1,2-propanediol have rather low water absorption, but extremely poor strength properties. Polyesters made from 3-methyl-1,5-pentanediol combine low water absorption with high strength. In addition, the presence of some 3-methyl-1,5-pentane-diol provides compatability of ethylene glycol with styrene.

The phthalic anhydride-maleic anhydride polyesters prepared above were made by the usual one-step processing technique; whereas the isophthalic acid-maleic anhydride polyesters were made by the common two-stage procedure. These polyesters were then made into castings using styrene as the cross-linking agent. Physical properties were then measured on these castings. However, most often unsaturated polyesterstyrene resins are used to impregnate fibrous materials, e.g., glass mats, which are then cured to produce laminates. These laminates are the well-known "fiber-glass" plastics used to form boat hulls, shower stalls, building facings, etc. The following experiments show the high water resistance imparted to unsaturated polyester-glass laminates by the use of 3-methyl-1,5-pentanediol as the glycol. At the same time, castings were also tested and they showed that MPD-containing polyesters had high impact strengths. These unsaturated polyesters were made by the well-known two-stage procedure generally utilized in most commercial polyester manufacturing processes when working with isophthalic acid.

EXAMPLE 17-22

Preparation of Unsaturated Isopolyester Resins

EXAMPLE 17

A 2-liter round-bottomed flask equipped with a stirrer, a gas inlet tube, thermometer, and a warm take-off condenser was charged with 332 grams (2 mols) of isphthalic acid and 472 grams (4.2 mols) of 3-methyl-1,5-pentanediol. While stirring, the temperatures of the mixture was raised to 200°-215°C. Nitrogen was passed slowly through the reaction mass. Heating and stirring was continued until 65 grams (3.6 mols) of water was removed through the condenser. Then 196 grams (2 mols) of maleic anhydride was added and the heating and stirring was continued until the acid number reached a value of 22. This polyester was dissolved in 595 grams of stabilized styrene to give a solution or resin having 40% styrene, 60% unsaturated polyester composition.

Other unsaturated polyesters were prepared in the same way from other glycols using the same molar ratios as before, as follows:

| Ex. No. | Glycol | Product Acid No. |
|---|---|---|
| 18 | 1,2-propanediol | 16 |
| 19 | diethylene glycol | 16 |
| 20 | 2,2-dimethyl-1,3-propanediol | 16 |
| 21 | 2,2,4-trimethyl-1,3-pentanediol | 20 |
| 22 | 3-methyl-1,5-pentanediol and ethylene glycol in a 1:3 molar ratio | 27 |

Preparation of Laminates

Laminates were prepared from each of the unsaturated polyester/styrene solutions of Examples 17 through 22 (inclusive) by the following procedure. Two sheets of 11×11 inches 1½-ounce glass mats (Owens-Corning M-700) and two sheets of 11×11 inches 10-mil glass veils (Owens-Corning M-514) were weighed. Then the polyester/styrene resin in a weight equal to about 3.8 times the weight of the glass was charged to a beaker and mixed with sufficient 5% t-butyl catechol in styrene solution to give a 40-50 minute gel time as determined on a separate resin sample (about 200 ppm of catechol). Next 0.5% by weight based on resin of a 6% cobalt naphthenate solution was added and well mixed. Finally, 3.0 weight percent of a 60% methyl ethyl ketone peroxide solution was added and well mixed. The resin solution was put under vacuum for 5 to 10 minutes to remove all air bubbles. Then a layer of resin was spread on a sheet of Mylar and a laminate built up by adding a glass veil, resin, a glass mat, resin, a glass mat, resin, glass veil and resin. Each veil and mat was tamped down to remove any entrained air. A 3/32 inch thick aluminum shim was placed on each side of the laminate which was then covered with a Mylar sheet and excess resin was forced out by rolling with an aluminum pipe. The laminates were allowed to cure for 2 weeks. In each case the finished laminate was 25± 2% glass by weight.

Preparation of Castings

Each of the polyester/styrene resin solutions prepared in Examples 17 through 22 (inclusive) were formed into glass-free castings by the following procedure: Five hundred grams of resin were mixed thoroughly with 10.0 grams of a 50% benzoylperoxide paste and were then evacuated to remove bubbles. The deaerated resin was next charged to molds to produce casting sheets ⅛inch thick and ¼inch thick. Curing was effected by heating for 2 hours at 150°F., 2 hours at 180°F. and 1 hour at 250°F.

Testing

The laminates and castings prepared above were tested for various physical properties. These results are summarized below.

| Resin of Ex. No. | Glycol in Resin* | Izod Impact** (ft.lbs/in.) | Casting Properties Tensile Property at Break# | | Laminate properties Flexural Strength in Boiling Water## (psi × $10^{-3}$) | | |
|---|---|---|---|---|---|---|---|
| | | | Strength (psi × $10^{-3}$) | Elongation (%) | Initial | After 14 days | After 60 days |
| 17 | MPD | 4.2 | 9.5 | 6.7 | 17.2 | 11.9 | 11.3 |
| 18 | PG | 2.4 | 9.2 | 0.7 | 18.6 | 11.8 | 5.8 |
| 19 | DEG | 5.7 | 9.8 | 7.5 | 22.3 | 10.0 | 7.4 |
| 20 | NPD | 2.1 | 10.8 | 2.4 | 16.0 | 15.0 | 8.4 |
| 21 | TMPD | 1.1 | 9.0 | 2.5 | 14.0 | 11.7 | 11.3 |
| 22 | MPD/EG | .6 | 12.5 | 3.3 | 23.1 | 11.6 | 5.4 |

*Initials as follows:
MPD = 3-methyl-1,5-pentanediol, PG = 1,2-propanediol, DEG = diethylene glycol,
NPD = 2,2-dimethyl-1,3-propanediol, TMPD = 2,2,4-trimethyl-1,3-pentanediol,
EG = ethylene glycol.
**ASTM D 648-56
ASTM D 638-71A
ASTM C 581-68

The data in the above table clearly shows that the polyester made from 3-methyl-1,5-pentanediol has superior impact strength and tenacity as compared to products made from glycols other than diethylene glycol, and it was nearly equivalent to this latter glycol. Furthermore, the data shows that the polyester made from 3-methyl-1,5-pentanediol had greatly superior flexural strength after 60 days in boiling water compared to the polyester made from diethylene glycol, or even those made from 2,2-dimethyl-1,3-propane diol. This latter glycol is the current commercial choice for making polyesters to be used in contact with water. 2,2-,4-trimethyl-1,3-pentanediol is another glycol recommended for use in aqueous environments. Although polyesters made from it do retain their flexural strength in contact with boiling water equivalent to a 3-methyl-1,5-pentanediol polyester, they are considerably more brittle. The above table of data shows that only 3-methyl-1,5-pentanediol polyesters have both a high water resistance and a high impact strength. For use in boat hulls, such a combination of properties is highly desirable.

What is claimed is:
1. An unsaturated polyester composition comprising approximately equimolar amounts of:
    a. a dihydric alcohol or mixture of dihydric alcohols comprising at least 10 mol percent 3-methyl-1,5-pentanediol;
    b. a dicarboxylic acid or anhydride comprising at least 20 mol percent ethylenically unsaturated dicarboxylic acid or anhydride.
2. A composition in accordance with claim 1 wherein from about 40 to 60 mol percent of said dicarboxylic acid or anhydride is an unsaturated dicarboxylic acid or anhydride selected from the group consisting of maleic acid, maleic anhydride and fumaric acid.
3. A composition in accordance with claim 2 wherein the remainder of said dicarboxylic acid or anhydride is selected from the group consisting of phthalic acid, isophthalic acid and their anhydrides.
4. A composition in accordance with claim 1 wherein the dihydric alcohols comprise a mixture of 3-methyl-1,5-pentanediol and a second dihydric alcohol selected from the group consisting of ethylene glycol, diethylene glycol and 1,2-propanediol.
5. A composition in accordance with claim 1 wherein at least 25 mol percent of said alcohol is 3-methyl-1,5-pentanediol.
6. A composition in accordance with claim 1 wherein all of said alcohol is 3-methyl-1,5-pentanediol.
7. A composition comprising from 25 to 75 percent by weight of the polyester, according to claim 1, and from 75 to 25 of a monoethylenically unsaturated polymerizable monomer having a >C=CH$_2$ group.
8. A composition comprising from 25 to 75 percent by weight of the polyester, according to claim 1, and from 75 to 25 percent styrene.
9. A composition comprising from 50 to 70 percent by weight of the polyester, according to claim 3, and from 50 to 30 percent styrene.
10. A composition comprising from 50 to 70 percent by weight of the polyester, according to claim 5, and from 50 to 30 percent styrene.
11. A thermoset polyester resin comprising the copolymerized composition of claim 7.
12. A thermoset polyester resin comprising the copolymerized composition of claim 8.
13. A thermoset polyester resin comprising the copolymerized composition of claim 9.
14. A thermoset polyester resin comprising the copolymerized composition of claim 10.

* * * * *